United States Patent
Roskott et al.

[11] 3,969,206
[45] July 13, 1976

[54] PROCESS FOR STABILIZATION OF ULTRAVIOLET LIGHT CURABLE UNSATURATED POLYESTER RESIN MIXTURE

[75] Inventors: Lodewijk Roskott, Gorssel; Arnoldus Adrianus Maria Groenendaal, Vorden, both of Netherlands

[73] Assignee: Akzona Incorporated, Asheville, N.C.

[22] Filed: June 18, 1973

[21] Appl. No.: 370,671

[30] Foreign Application Priority Data
June 20, 1972  Netherlands...................... 7208381

[52] U.S. Cl...................... 204/159.15; 204/159.19; 260/40 R; 260/45.7 R; 260/866
[51] Int. Cl.² ................. C08G 63/02; C08K 67/06; C08K 5/04; C08F 8/00
[58] Field of Search.................. 204/159.14, 159.23, 204/159.15, 159.19; 260/45.7, 861, 866

[56] References Cited
UNITED STATES PATENTS

| | | | |
|---|---|---|---|
| 2,610,168 | 9/1952 | Anderson...................... | 260/45.7 R |
| 2,951,758 | 9/1960 | Notley........................... | 204/159.23 |
| 3,607,693 | 9/1971 | Heine et al. .................. | 204/159.15 |
| 3,627,657 | 12/1971 | Nistri et al..................... | 204/159.15 |

OTHER PUBLICATIONS
Noyes Data Corporation, Polymer Additives: Guidebook and Directory, (1972), p. 192.

*Primary Examiner*—Murray Tillman
*Assistant Examiner*—Thurman K. Page
*Attorney, Agent, or Firm*—Stevens, Davis, Miller & Mosher

[57] ABSTRACT

A process for stabilizing an ultraviolet light curable unsaturated polyester resin mixture containing a benzoin compound as a photosensitizer is disclosed. A stabilizing amount of a compound of the formula

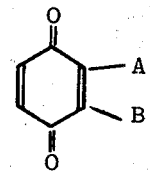

wherein A is a methyl group, B is a hydrogen atom or A and B together represent a substituted or nonsubstituted benzo group is added to the mixture which can also contain a filler, a quaternary ammonium compound and a copper or iron compound soluble in the unsaturated polyester resin. The composition and cured product are also disclosed.

26 Claims, No Drawings

PROCESS FOR STABILIZATION OF ULTRAVIOLET LIGHT CURABLE UNSATURATED POLYESTER RESIN MIXTURE

The present invention relates to a process for stabilizing unsaturated polyester resins, preferably those containing fillers, which are curable by ultraviolet light and which contain a benzoin compound as a photosensitizer and a quinone compound as a stabilizer; the invention also relates to the stabilized unsaturated polyester resin compositions per se and to the curing of these compounds.

The expression "unsaturated polyester resins" as used in the present specification means mixtures of unsaturated polyesters and one or more polymerizable ethylenically-unsaturated monomers, such as styrene, vinyl toluene, methyl methacrylate, diallyl phthalate, divinyl benzene, para-tert. butyl benzene and vinyl acetate (see U.S. Pat. No. 3,367,994 which is hereby incorporated into the specification). The unsaturated polyester may be obtained by the condensation of a polyhydric alcohol, such as ethylene glycol, propylene glycol or diethylene glycol, with an $\alpha, \beta$-unsaturated dibasic carboxylic acid, such as maleic acid, fumaric acid, itaconic acid or the corresponding anhydrides, if desired, in the presence of saturated acids, such as malonic acid, adipic acid, sebacic acid, tartaric acid as well as phthalic acid, isophthalic acid and tetrachlorophthalic acid. The weight ratio of monomer to unsaturated polyester generally ranges from 30–50 parts of monomer to 70–50 parts of polyester.

In order to prevent the unsaturated polyester resins from undergoing premature gelation on storage in the dark, stabilizers are added thereto. For this purpose, guinonoid compounds have previously been proposed, such as p=benzoquinone or 2,5-di-tert.butylbenzoquinone; phenolic compounds, such as hydroquinone, t.butylpyrocatechol, 3-methylpyrocatechol or 4-ethylpyrocatechol, in amounts of 0.005% – 0.15% by weight, preferably 0.01% by weight calculated on the weight of the unsaturated ester; copper compounds, such as copper naphthenate have also been proposed.

Unsaturated polyester resins may be cured with the aid of ultraviolet irradiation. To this end, photosensitizers are incorporated into the unsaturated polyester resin. As such, benzoin, benzoin ethers derived from primary and secondary alcohols, e.g., benzoin methylether, benzoin ethylether, benzoin isopropylether, benzoin isobutylether, benzoin sec.butylether, benzoin octylether, and benzoin cyclohexylether; nuclear-substituted benzoins, such as anisoin, p,p'-dimethyl benzoin or o,o'-dichlorobenzoin and benzoins substituted in the $\alpha$-position have been applied in practice. These photoinitiators are usually incorporated into the polyester resin in quantities of 0.1% to 5% by weight, preferably, however, of 1.0% to 2.0% by weight.

It is known from German Patent Specification No. 1,945,725 that unsaturated polyester resins containing, in addition to the benzoin compounds hereinbefore described, the quinonoid and/or phenolic stabilizers as photosensitizers also hereinbefore described, have poor stability. Moreover, the curing of the polyester resin is strongly retarded by this combination.

If the unsaturated resins are to be applied as putties or applied on solid substances, such as wood-chip-plates and flaxfiber-plates, fillers must be incorporated in the polyester resins. However, these fillers have an unfavorable influence upon the stability of the polyester resin.

It has been found that by incorporating a compound having the general formula:

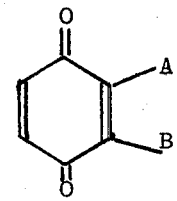

wherein A represents a methyl group and B is a hydrogen atom, or A and B together represent a substituted or non-substituted benzo group, into ultraviolet curable unsaturated polyester resins, especially filler-containing polyester resins with a content of benzoin compounds as photosensitizers, a composition may be obtained which has not only good stability, but moreover exhibits good curing under irradiation by ultraviolet light.

Examples of compounds to be used as stabilizers according to the invention are methyl-p-benzoquinone and naphthoquinone-1,4. The stabilizers to be used according to the invention are incorporated in the unsaturated polyester resin in quantities ranging from 0.5% to 2% by weight, preferably in a quantity of 1.0% by weight, calculated on the photosensitizer.

The stabilizing effect of the compounds to be used according to the invention may be still further improved by the additional incorporation of quaternary ammonium compounds into the unsaturated polyester resin, preferably in combination with iron or copper in the form of a compound soluble in the resin, such as copper naphthenate or iron chloride, in quantities preferably from 1 to 4 p.p.m. or iron or copper and from 0.02% to 0.05% by weight of a quaternary ammonium compound calculated on the polyester resin. Quaternary ammonium compounds suited for this purpose include: $C_{12}$–$C_{18}$ alkyldimethylbenzyl ammonium chloride, $C_{12}$–$C_{18}$ alkyldimethylethylbenzyl ammonium chloride, phenyltrimethyl ammonium chloride, stearyldimethylbenzyl ammonium chloride, alkyldimethylisoquinolinium chloride and dialkyldimethyl ammonium chloride.

Fillers which have been found to be particularly suitable for incorporation into the composition according to the invention are calcium carbonate, calcium magnesium carbonate, magnesium silicate, calcium magnesium silicate, aluminium silicate, silicon oxide, barium sulfate and calcium sulfate.

In addition to the above recited fillers, the unsaturated polyester resin may also contain the usual stabilizers and paraffin waxes or other waxy materials, which exude at the beginning of the polymerization and prevent inhibition of atmospheric oxygen activity.

In addition to sunlight, mercury lamps, tungsten lamps and xenon lamps having a wavelength of 2000 to 4500A may be considered as suitable ultraviolet light sources.

The following examples illustrate the invention. Where reference is made in these examples to an unsaturated polyester resin, it is intended to refer to an all-purpose composition obtained by condensing 1 mol of maleic anhydride and 1 mol of phthalic anhydride with 1.1 mol of ethylene glycol and 1.1 to 1.2 mol of propane-diol-1,2.

Esterification took place at a temperature of 200°C whil stirring under a nitrogen current. After addition of 0.01 part by weight of hydroquinone to 100 parts by weight of the condensate was carried out, the latter was mixed with styrene in a ratio of 65 : 35. The resulting unsaturated polyester resin had an acid number of about 50.

After incorporation of a benzoin compound and a stabilizer according to the invention into the unsaturated polyester resin had been accomplished, the latter was spread by means of a film drawing knife on glass plates in layers having a thickness of 300 microns.

In order to prevent air-inhibition, 0.1% by weight of a solid paraffin having a melting point of 52°–54°C was added to the resin. The resin sheets thus obtained were irradiated with an artificial ultraviolet light source having an emission mainly in the range from 300 to 400 n.m. The light source was placed 20 cm above the resin sheet. The light duration was 30 or 60 seconds respectively.

The curing was determined with an oscillation hardness measuring apparatus according to Persoz.

When using a putty, that is to say, a resin-filler-mixture, the same procedure was followed. However, normally solid paraffin is not used, as this could only separate from these filled systems with difficulty. The rate of curing of putties was determined with the aid of the residual styrene-content of the resin cured according to the method described in "Kunststoffe" 1963-53 (10) 801-804. This determination method, which indicates the content of non-copolymerized monomer, permits a very clean determination of the curing rate.

The storage stability of the unsaturated resin containing a benzoin compound and a stabilizer was determined at 100°C under the exclusion of light. The determination was continued until gelation of the resin had occurred.

EXAMPLE I 1 part by weight of a benzoin ether and 0.01 part by weight of a stabilizer according to the invention were successively added to 100 parts by weight of an unsaturated polyester resin obtained according to the process hereinbefore described. The stability in the dark at 100°C and the hardness according to Persoz of the composition thus obtained were determined after illumination for 60 seconds.

Comparable tests were made with the polyester resin in which solely the benzoin ether had been dissolved, and with the polyester resin in which the n-butylether of benzoin together with one of the hitherto usual stabilizers had been dissolved.

The compositions used and the results obtained are set forth in Table 1.

EXAMPLE II 1 part by weight of n-butylether of benzoin, 0.01 part by weight of methyl p-benzoquinone, 0.025 parts by weight of alkyldimethylbenzyl ammonium chloride and 0.0001 part by weight of copper naphthenate or 0.0002 parts by weight of iron chloride were dissolved in 100 parts by weight of the unsaturated polyester resin hereinbefore described. The alkyldimethylbenzyl ammonium chloride contained 5% by weight of dodecyldimethylbenzyl ammonium chloride, 60% by weight of tetradecyldimethylbenzyl ammonium chloride, 30% by weight of hexadecyldimethylbenzyl ammonium chloride and 5% by weight of octadecyldimethylbenzyl ammonium chloride. The stability in the dark at 100°C and the hardness according to Persoz of the composition thus obtained were determined after illumination for 60 seconds.

Comparable tests were made with the polyester resin containing solely the n-butylether of benzoin, and with the polyester resin in which the same ether had been dissolved together with copper naphthenate or iron chloride optionally in combination with the alkyldimethylbenzyl ammonium chloride or methyl p-benzoquinone.

The compositions used and the results obtained are set forth in Table 2.

EXAMPLE III 2 parts by weight of a benzoin ether and 0.02 parts by weight of a stabilizer according to the invention were successively dissolved in 100 parts by weight of the unsaturated polyester resin hereinbefore described. Subsequently, 100 parts by weight of calcium magnesium silicate were admixed. The stability in the dark at 100°C and the residual styrene-content of the compositions thus obtained were determined after illumination for 30 seconds.

Comparable tests were made with a composition containing solely the benzoin ether and the calcium magnesium silicate, and with the polyester resin containing the n-butylether of benzoin and the calcium magnesium silicate together with one of the hitherto usual stabilizers.

The compositions used and the results obtained are set forth in Table 3.

EXAMPLE IV 2 parts by weight of n-butylether of benzoin, 0.02 parts by weight of methyl p-benzoquinone and 0.05 parts by weight of alkyldimethylbenzyl ammonium chloride were dissolved in 100 parts by weight of the unsaturated polyester resin hereinbefore described. Subsequently, 100 parts by weight of calcium magnesium silicate were admixed. The stability in the dark at 100°C and the residual styrene-content of the composition thus obtained were determined after illumination for 30 seconds.

Comparable tests were made with a composition containing solely the n-butylether of benzoin and the calcium magnesium silicate, and with a composition containing in addition the alkyldimethylbenzyl ammonium chloride or the methyl p-benzoquinone.

The compositions used and the results obtained are set forth in Table 4.

EXAMPLE V

In an analogous way to that described in Example III, tests were made in which the 100 parts by weight of calcium magnesium silicate were replaced by 66.7 parts by weight of magnesium silicate.

The compositions used and the results obtained are set forth in Table 5.

EXAMPLE VI

In an analogous way to that described in Example IV, tests were made in which the 100 parts by weight of calcium magnesium silicate were replaced by 66.7 parts by weight of magnesium silicate.

The compositions used and the results obtained are set forth in Table 6.

TABLE 1

| 1% of benzoin ether | % | stabilizer | stability in mins | Persoz hardness |
|---|---|---|---|---|
| n-butyl | — | — | 60 | 108 |
| n-butyl | 0.1 | p-tert.butylpyrocatechol | 103 | 22 |
| n-butyl | 0.01 | p-benzoquinone | 243 | 44 |
| n-butyl | 0.01 | naphthoquinone-1,4 | 320 | 107 |
| n-butyl | 0.01 | methyl p-benzoquinone | 350 | 103 |
| isopropyl | — | — | 98 | 170 |
| isopropyl | 0.01 | methyl p-benzoquinone | 420 | 168 |
| methyl | — | — | 34 | 182 |
| methyl | 0.01 | methyl p-benzoquinone | 157 | 178 |
| ethyl | — | — | 48 | 163 |
| ethyl | 0.01 | methyl p-benzoquinone | 260 | 159 |

TABLE 2

| 1% of benzoin n-butyl ether | 0.0001% of copper | 0.0002% of iron | 0.025% of alkyldimethyl-benzyl ammonium chloride | 0.01% of methyl p-benzoquinone | stability in mins | Persoz hardness |
|---|---|---|---|---|---|---|
| + | — | — | — | — | 60 | 108 |
| + | + | — | — | — | 120 | 110 |
| + | + | — | — | + | 480 | 107 |
| + | + | — | + | — | 340 | 111 |
| + | + | — | + | + | >510 | 106 |
| + | — | + | — | — | 60 | 109 |
| + | — | + | — | + | 355 | 104 |
| + | — | + | + | — | 360 | 110 |
| + | — | + | + | + | >550 | 107 |

TABLE 3

| 2% of benzoin ether | 100% of calcium magnesium silicate | % | stabilizer | stability in mins | residual styrene content after illumination for 30 seconds |
|---|---|---|---|---|---|
| n-butyl | + | — | — | 21 | 1.8 |
| n-butyl | + | 0.2 | p-tert.butylcatechol | 30 | 3.8 |
| n-butyl | + | 0.2 | hydroquinone | 53 | 5.2 |
| n-butyl | + | 0.02 | p-benzoquinone | 101 | 3.0 |
| n-butyl | + | 0.02 | 2,5-ditert.butyl p-benzoquinone | 28 | 2.8 |
| n-butyl | + | 0.02 | naphthoquinone-1,4 | 130 | 1.9 |
| n-butyl | + | 0.02 | methyl p-benzoquinone | 133 | 2.0 |
| methyl | + | — | — | 16 | 1.9 |
| methyl | + | 0.02 | methyl p-benzoquinone | 67 | 2.1 |
| ethyl | + | — | — | 20 | 1.7 |
| ethyl | + | 0.02 | methyl p-benzoquinone | 104 | 1.8 |
| isopropyl | + | — | — | 48 | 1.6 |
| isopropyl | + | 0.02 | methyl p-benzoquinone | 215 | 1.8 |

TABLE 4

| 2% of benzoin n-butyl ether | 100% of calcium magnesium silicate | 0.05% of alkyldimethyl benzyl ammonium chloride | 0.02% of methyl p-benzoquinone | stability in mins | residual styrene-content |
|---|---|---|---|---|---|
| + | + | — | — | 21 | 1.8 |
| + | + | + | — | 28 | 1.8 |
| + | + | — | + | 133 | 1.9 |
| + | + | + | + | 150 | 2.0 |

TABLE 5

| 2% of benzoin ether | 66.7% of magnesium silicate | % | stabilizer | stability in mins | residual styrene-content after illumination for 30 seconds |
|---|---|---|---|---|---|
| n-butyl | + | — | — | 9 | 2.3 |
| n-butyl | + | 0.2 | p-tert.butylpyrocatechol | 27 | 4.2 |
| n-butyl | + | 0.2 | hydroquinone | 33 | 5.6 |
| n-butyl | + | 0.02 | p-benzoquinone | 77 | 3.2 |
| n-butyl | + | 0.02 | 2,5-ditert.butyl p-benzoquinone | 12 | 2.8 |
| n-butyl | + | 0.02 | naphthoquinone-1,4 | 115 | 2.3 |
| n-butyl | + | 0.02 | methyl p-benzoquinone | 110 | 2.4 |
| methyl | + | — | — | 10 | 2.4 |
| methyl | + | 0.02 | methyl p-benzoquinone | 72 | 2.4 |
| ethyl | + | — | — | 9 | 2.2 |
| ethyl | + | 0.02 | methyl p-benzoquinone | 98 | 2.4 |
| isopropyl | + | — | — | 16 | 2.2 |

TABLE 5-continued

| 2% of benzoin ether | 66.7% of magnesium silicate | % | stabilizer | stability in mins | residual styrene-content after illumination for 30 seconds |
|---|---|---|---|---|---|
| isopropyl | + | 0.02 | methyl p-benzoquinone | 203 | 2.3 |

TABLE 6

| 2% of benzoin n-butyl ether | 66.7% of magnesium silicate | 0.05% of alkyldimethyl-benzyl ammonium chloride | 0.02% of methyl p-benzoquinone | stability in mins | residual styrene-content after illumination for 30 seconds |
|---|---|---|---|---|---|
| + | + | − | − | 9 | 2.3 |
| + | + | + | − | 20 | 2.1 |
| + | + | + | + | 140 | 2.3 |
| + | + | − | + | 116 | 2.3 |

What is claimed is:

1. A process for stabilizing a composition curable by ultraviolet light consisting essentially of an unsaturated polyester resin which is a mixture of an unsaturated polyester resin obtained by condensation of a polyhydric alcohol and and $\alpha, \beta$ unsaturated dibasic carboxylic acid and at least one polymerizable ethylenically unsaturated monomer and as photosensitizer a benzoin compound comprising incorporating into said composition a stabilizing amount of methyl p-benzoquinone.

2. The process of claim 1, wherein the stabilizer compound is incorporated into said mixture in an amount of 0.5 - 2.0% by weight, calculated on the photosensitizer.

3. The process of claim 2, wherein the stabilizer compound is present in an amount of 1.0%.

4. The process of claim 1, wherein said benzoin compound is present in an amount of 0.1 to 5.0% by weight, calculated on the unsaturated polyester resin.

5. The process of claim 1, wherein said benzoin compound is selected from the group consisting of benzoin methylether, benzoin ethylether, benzoin isopropylether, benzoin isobutylether, benzoin sec.-butylether, benzoin cyclohexylether, anisoin, p,p'-dimethyl benzoin and o,o'-dichloro benzoin.

6. The process of claim 1, wherein said mixture further contains a quaternary ammonium compound.

7. The process of claim 6, wherein said quaternary ammonium compound is present in an amount of 0.02 - 0.05% by weight, calculated on the unsaturated polyester resin.

8. The process of claim 1, wherein said mixture further contains a copper compound soluble in said unsaturated polyester resin.

9. The process of claim 8, wherein said copper compound is copper naphthenate.

10. The process of claim 1, wherein said mixture further contains an iron compound soluble in said unsaturated polyester resin.

11. The process of claim 10, wherein said iron compound is iron chloride.

12. The process of claim 1 wherein said mixture contains a filler.

13. The process of claim 12, wherein said filler is selected from the group consisting of calcium carbonate, calcium magnesium carbonate, magnesium silicate, calcium magnesium silicate, aluminum silicate, silicon oxide, barium sulfate, and calcium sulfate.

14. A stabilized composition curable by ultraviolet light consisting essentially of an unsaturated polyester resin which is a mixture of an unsaturated polyester resin obtained by condensation of a polyhydric alcohol and an $\alpha, \beta$ unsaturated dibasic carboxylic acid and at least one polymerizable ethylenically unsaturated monomer, a benzoin compound as a photosensitizer and methyl p-benzoquinone present in an amount sufficient to stabilize said composition.

15. A process for curing unsaturated polyester resin comprising irradiating the composition of claim 14 with a light source having an emission in a range of 300 to 400 n.m.

16. A cured polyester resin produced by the process of claim 15.

17. The composition of claim 14, wherein said stabilizing compound is present in an amount of 0.5 - 2.0% by weight, calculated on the photosensitizer.

18. The composition of claim 4, wherein said benzoin compound is present in an amount of 0.1 to 5.0% by weight, calculated on the unsaturated polyester resin.

19. The composition of claim 14, wherein said benzoin compound is selected from the group consisting of benzoin methylether, benzoin ethylether, benzoin isopropylether, benzoin isobutylether, benzoin sec.-butylether, benzoin cyclohexylether, anisoin, p,p'-dimethyl benzoin and o,o'-dichloro benzoin.

20. The composition of claim 14 further containing a quaternary ammonium compound in an amount of 0.02 - 0.05% by weight, calculated on the unsaturated polyester resin.

21. The composition of claim 14 further containing a copper compound soluble in said unsaturated polyester resin.

22. The composition of claim 14 wherein said copper compound is copper naphthenate.

23. The composition of claim 14 further containing an iron compound soluble in said unsaturated polyester resin.

24. The composition of claim 14 wherein said iron compound is iron chloride.

25. The composition of claim 14 further containing a filler.

26. The composition of claim 25 wherein said filler is selected from the group consisting of calcium carbonate, calcium magnesium carbonate, magnesium silicate, calcium magnesium silicate, aluminum silicate, silicon oxide, barium sulfate, and calcium sulfate.

* * * * *